Jan. 28, 1969 J. L. L. DELVAUX 3,424,860

COLOR TELEVISION RECORDING AND REPRODUCING SYSTEM

Filed March 2, 1966

United States Patent Office 3,424,860
Patented Jan. 28, 1969

3,424,860
COLOR TELEVISION RECORDING AND REPRODUCING SYSTEM

Jean Léon Lucien Delvaux, Paris, France, assignor to Compagnie Francaise Thomson Houston-Hotchkiss Brandt, Paris, France, a corporation of France Filed Mar. 2, 1966, Ser. No. 531,139
Claims priority, application France, Mar. 19, 1965, 9,933
U.S. Cl. 178—5.2 6 Claims
Int. Cl. H04n *1/46, 9/00*

ABSTRACT OF THE DISCLOSURE

There is disclosed a recorder for color television signals wherein the chrominance signal is recorded in a frequency in a frequency band distinct from the frequency spectrum of the luminance signal, the bands being defined by the characteristics of the recording head.

There are many circumstances in which it is required to record televised scenes on a storage medium for display at some later time. The need arises both in television broadcasts, where it is often convenient to record a programme in advance of broadcasting, and also in so-called closed-circuit television, such as industrial, didactic and other television installations.

Such recording is commonly carried out by means of magnetic recorders, though other types of transducing apparatus, including especially electro-optical transducers of the kind used in film sound track recording, are also used or usable.

Where color television is concerned, the recording of the color TV signals raises certain difficulties due to the complex nature of these signals and the consequent broadband frequency requirements imposed on the recording and reproducing apparatus. The basic color TV signal consists of three video components representing the three primary colors, red, green and blue. In current color television work these basic signals are not used in their crude form. Instead they are converted, by suitably linearly combining them in a matrix network, into a luminance signal, indicative of image brightness, and one or two chrominance component signals, indicative of color. The N.T.S.C. standard prevalent in the United States and other countries specifies two chrominance components. Other systems, such as the "sequential memory" color TV system used in France and elsewhere, requires the transmission of but a single chrominance component at a time. Yet other systems apply the dichrome process in which there are only two color components instead of three.

It is thus seen that a color TV signal consists of a minimum of two, and more frequently three video components. In order to economize on frequency channels, it has been standard practice both in the transmission and the recording of color TV signals to impress the luminance signal on a main carrier frequency by frequency modulation, and to impress the chrominance signal or signals (which require a smaller frequency spread than does the luminance signal) on a subcarrier or subcarriers intercalated in the frequency spectrum of the luminance signal.

While this standard procedure is desirable in that it achieves a considerable saving on the total frequency channel requirements, it is not altogether satisfactory since there necessarily is some difficulty in effecting a full separation between the luminance and chrominance signals, when thus interspersed. Incomplete separation tends to produce objectionable disturbances in the displayed picture. Particularly in regard to the color TV recording and reproducing techniques to which this invention is broadly directed, insertion of the chrominance signals in the midst of the frequenty spectrum of the luminance signal has necessitated the use of expensive, broadband recording and reproducing equipment for avoiding intolerable color distortion and display of parasitic patterns on the TV screen.

Objects of this invention are the provision of improved method and means of recording and reproducing color television pictures, whereby the chrominance (or other color information) signals can be stored on the record medium in a frequency band separate and distinct from the frequency spectrum of the luminance (or other picture information) signal, thereby eliminating the above-mentioned deficiencies in the display, while permitting the use of inexpensive, standard transducer equipment for the recording and reproducing processes.

The invention is based on a known property of practical transducing machines such as magnetic and electro-optical recorders, in which a recording medium (tape or film) is subjected to scanning movement past a transducer head having a scanning gap (e.g., airgap or optical slit) of finite width as measured in the direction of scan displacement. In any such device, the response drops to zero for each of a series of frequency values of the signal as recorded on the medium, these frequency values being related to the width of the scanning gap. Thus, the amplitude/frequency response curve of such a device presents a number of adjacent loops, in the general shape of inverted U's, juxtaposed along the frequency axis. Normally, only the initial one of such response loops, encompassing a frequency range from zero to a first zero-response frequency, is utilized for recording all of the color TV signal, including luminance and chrominance components. In accordance with this invention, on the other hand, at least one color component of the TV signal is recorded in a frequency band forming part of the second and/or a higher-order loop of the response curve. For example, in the case of a standard TV signal including a luminance component and two chrominance components, the luminance signal would be recorded in the usual way within the compass of the initial response loop, while the two chrominance components may be recorded in the frequency ranges of the second and third loops, or alternatively, both within the range of the second loop. In the reproducing or reading section of the system, the luminance and chrominance signals are then easily filtered out into separate channels and processed in a generally conventional manner without danger of objectionable interaction.

It has been already proposed that the second and higher-order loops in the response curve of TV signal recording and reading apparatus be used, in one modification of that system, to record a control signal used for color synchronization purposes. I am also aware that there has been a prior proposal to record a pilot signal in such a higher-order frequency range of a magnetic tape recorder to serve in controlling the gain during read-out, as disclosed in Ryan's co-pending U.S. application Ser. No. 226,393 filed Sept. 26, 1962. My present invention differs fundamentally from such prior proposals in that it employs such higher-order frequency ranges of the response curve for recording not a control or pilot signal, but a color information signal which is an inherent component of the total color television signal being recorded. I have found that, even though the signal/noise ratio present on reproduction of a color signal component thus recorded is slightly lower than what it would be if recorded in the first-order frequency range of the response curve, this is entirely permissible in view of the narrower bandwidth requirements of chrominance components, and that any difficulties that would tend to arise can be successfully resolved through the use of certain compensating and correcting means to be disclosed.

An exemplary embodiment of the invention will now be described with reference to the accompanying drawings, wherein.

Figure 3:
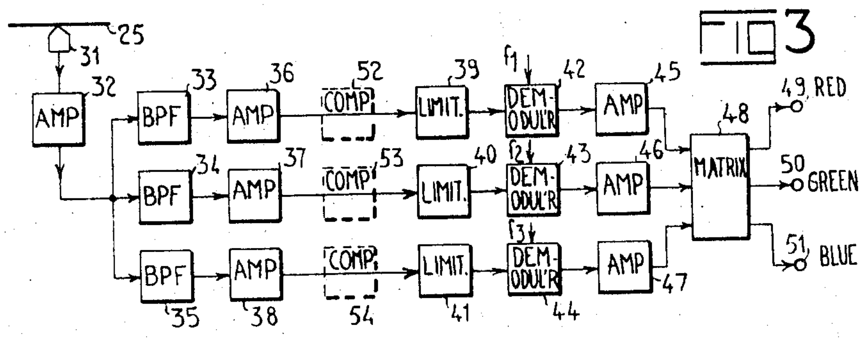
Figure 4:
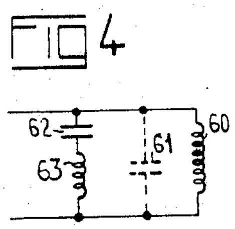
Figure 5:
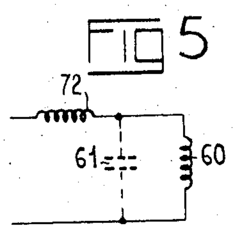

FIG. 3 similarly shows the reproducing or read-out section;

FIG. 4 shows one form of impedance-matching network which is preferably associated with a magnetic transducer head according to the invention;

FIG. 5 shows an alternative impedance-matching network; and

Figure 6:
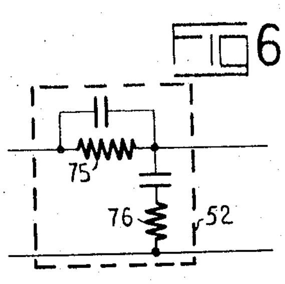

FIG. 6 shows a non-linearity compensating network preferably used in each channel of the system shown in FIG. 3.

Figure 1:
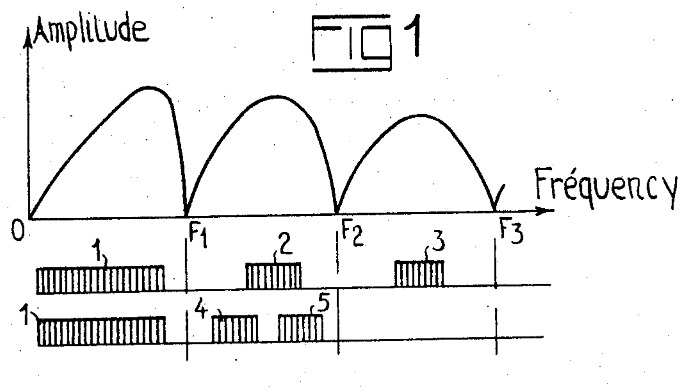
FIG. 1 shows the multi-loop amplitude/frequency response curve of a typical magnetic transducer, and indicates the frequency bands usable according to various embodiments of the invention for the recording of the various signal components.

Referring to the amplitude vs. frequency response curve for a typical magnetic tape reader shown by the graph of FIG. 1, it will be noted that the response drops to zero at each of a series of frequency values 0, $F_1$, $F_2$, $F_3$ . . . and is maximal intermediate such frequencies. The first finite frequency value $F_1$ at which the response is zero corresponds to the frequency of a signal, as recorded on the tape, having a wavelength equal to the width of the non-magnetic gap of the reading transducer head. The subsequent frequency values $F_2$, $F_3$ of the series are in theory exactly equal (and in practice roughly equal) to multiples of the initial frequency $F_1$, that is, they are the frequencies of signals having wavelengths equalling integral submultiples of the said gap width.

This peculiarity has been disclosed e.g. in "Magnetic Recording Techniques" by W. Earl Stewart (The McGraw-Hill Book Co. Inc., 1958, page 69). Briefly to outline the theory involved, there may be considered a sinusoidal distribution of magnetism representing a signal recorded on the magnetic tape, such that the wavelength of the sinusoid equals the width of the airgap of the transducer head, as measured parallel to the tape. As the tape bearing such a recorded signal distribution moves past the airgap, it will be evident that a given displacement of the tape will not produce any variation in the magnetic potential difference across the airgap, since an increase of the potential at one end of the gap will be compensated by an equal increase of the potential at the other end of the gap. There will, therefore, be no induced current through the windings of the reading head and no reproduced signal. The same will be true for magnetic signal distributions whose wavelengths correspond to integral fractions of the airgap width.

By the same token, the reading head will give maximum response for signals whose wavelengths are such that the half wave is an odd submultiple of the airgap width. Thus, a response curve of the general shape shown in FIG. 1 results. It will be noted that in a practical system, the nodal frequencies such as $F_1$, $F_2$, $F_3$ are not truly multiples of one another, since the effective width of the gap is not exactly equal to its geometric width and varies somewhat with frequency. Also, the successive response loops have decreasing peak altitudes. However, the general form of the curve is an indicated. The loops are seen to have a relatively blunt shape so that each loop provides a frequency range of substantial extent to both sides of the maximum response, over which the response remains comparatively uniform in value.

In conventional tape recording work, only the frequencies encompassed by the initial loop, up to frequency $F_1$, have generally been used. Recently, however, it has been proposed to use the frequency range defined by a higher loop such as the frequency range $F_1$–$F_2$, in order to record a synchronizing control signal or a gain control signal.

In the present invention, it is proposed to utilize the additional frequency ranges provided by the higher response loops, such as the ranges $F_1$–$F_2$, $F_2$–$F_3$, in order to record the chrominance (or other color) component or components of a color television signal on the same tape as, but separately from, the main or luminance component of the color TV signal. For example, as applied to a color TV system of the type using a luminance component and two chrominance components, the invention may comprise recording the luminance component over a first frequency band such as 1 (FIG. 1) extending over a major intermediate portion of the initial response loop, recording a first chrominance component in a frequency band 2 extending over a minor intermediate section of the second response loop and recording the second chrominance component in a frequency band 3 extending over a minor intermediate section of the third response loop.

Figure 2:
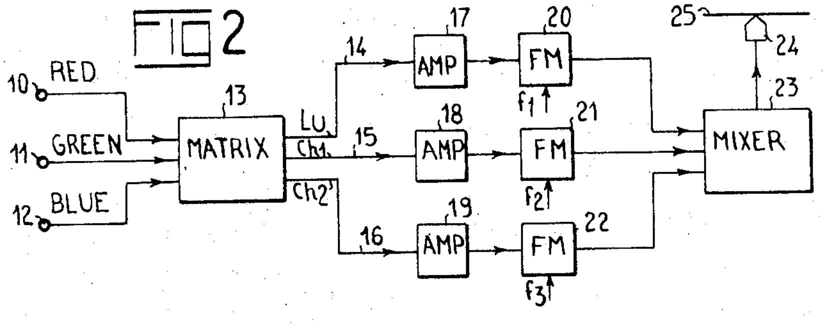
FIG. 2 is a block diagram of the recording section of the improved system.

Recording apparatus for carrying out this aspect of the invention is illustrated in FIG. 2. As shown, the apparatus includes three input terminals 10, 11, 12 to which are applied the red, green and blue video signals, as derived from a conventional camera tube array by way of the usual gamma correction unit, not shown. The three color signals from input terminals 10, 11, 12 are applied in the usual manner to the inputs of a matrix 13 which forms linear combinations of the three color signals to provide a luminance signal Lu in a matrix output channel 14, a first chrominance component in the channel 15 and a second chrominance component in a channel 16. The signals in the three channels 14, 15, 16 are passed through respective amplifiers 17, 18, 19, and then through frequency modulators 20, 21, 22. In the frequency modulators, the luminance signal and the two chrominance signals act the frequency-modulate respective carrier signals having the respective means frequencies $f_1$, $f_2$, $f_3$. The carrier frequency values are so selected as to provide at the outputs of the modulators 20, 21 and 22, signals in respective frequency bands corresponding to the bands 1, 2 and 3 in FIG. 1. The frequency modulated signals in the three channels are applied to a mixer amplifier 23 and the composite output signal from the mixer is applied to the windings of a recording transducer head 24 so as to be recorded thereby as a composite magnetic pattern on a magnetic tape 25 displaced past the head.

In the playback or reproducing section, shown in FIG. 3, the magnetic tape 25 having the composite color TV signal recorded thereon is passed through a conventional reading unit past a reading transducer head 31. The complex electric signal from head 31 is amplified in an amplifier 32, and applied in parallel to three band-pass filters 33, 34, 35 having frequency characteristics corresponding to the respective frequency bands 1, 2 and 3 (FIG. 1). Thus the three signal channels derived from the outputs of band-pass filters 33, 34 and 35 carry the luminance signal and the first and second chrominance component signals of the original color TV signal, respectively. The three signals are passed through respective channel amplifiers 36, 37, 38 and thence applied to amplitude limiters 39, 40, 41 preferably by way of nonlinear compensating networks 52, 53, 54 later described. After the amplitude limiting step the three channel signals are applied to the inputs of respective frequency demodulators or discriminators 42, 43, 44 in which they are demodulated in relation to the respective center frequencies $f_1$, $f_2$ and $f_3$. The demodulated luminance, first chrominance and second chrominance signals after amplification in amplifiers 45, 46, 47 are passed to a matrix network 48 in which they are subjected to a linear combining step reverse from that applied by the matrix 13 in the recording section (FIG. 2), so as to deliver at the output terminals 49, 50, 51, the red, green and blue video signals originally recorded.

The afore-mentioned compensator networks 52, 53, 54 serve the following purpose. Because of the non-uniform amplitude response with frequency over each of the three frequency ranges 1, 2, and 3, as evidenced by the drooping of each of the three response loops of FIG. 1 left and right from its peak amplitude value, a spurious amplitude-modulation component is introduced into each of the three signals delivered by the bandpass filters 33, 34, 35. While this spurious amplitude modulation component can in many cases be satisfactorily suppressed by the amplitude limiter devices 39, 40, 41, it may in some cases be desirable to compensate more positively for the falling-off of the amplitude to either side of the mid-frequency of the range of each signal, and impart to the signals an amplitude characteristic that is substantially uniform over the entire range. Compensating networks 52, 53, 54 may then be introduced into some or all of the signal channels. The compensating networks may be constructed as shown for network 52 in FIG. 6. The illustrated network includes a parallel R-C circuit 75 connected between one of its two input terminals and the corresponding output terminal, and a series R-C circuit 76 connected across its output terminals. As is well-known in the art, such a network 52 will introduce maximum attenuation into signals passed through it in a mid-region of a frequency range determined by the constants of the network, and minimum attenuation towards the ends of said range. Thus the transfer characteristic of a network such as 52 will have a reverse curvature from that of the response curve loops shown in FIG. 1, and by a suitable choice of the network constants the desired compensation can be achieved.

If desired, suitable modifying networks, not shown, may be interposed in the three channels of the recording apparatus of FIG. 2, between the output of matrix 13 and the input to mixer 23, in order to modify the transfer characteristics of the signals passed therethrough. it will be understood that in such case the compensating networks 52, 53, 54, if any are provided in the playback section, would be so predetermined as to take into account the modification thus introduced into the amplitude/frequency response curves of the reproduced signals.

Impedance matching means are desirably associated with the recording head 24 and/or the reading head 31 in order to facilitate the transfer of the auxiliary high-frequency chrominance signal component or components in the frequency band 2 and/or 3. The impedance matching means may take the form shown in FIG. 4, in which the inductance 60 represents the inductance of the windings of a magnetic transducer head, and 61 represents the parasitic capacitance thereof. There is provided a series circuit including an inductance 63 and capacitor 62 connected in parallel across the windings 60 of the magnetic head. Elements 62 and 63 are suitably predetermined to provide a resonance frequency approaching a selected nodal frequency of the response curve of FIG. 1, preferably the $F_1$ frequency. The effect will be to raise the impedance of the circuit assembly including inductance 60 and capacitance 61 for frequencies above the selected resonance frequency such as $F_1$, and thus improve the transfer characteristic of the chrominance component signals. In the alternative impedance matching circuit shown in FIG. 5, there is simply provided an inductor 72 connected in series with the inductance 60 of the magnetic head windings, and so selected as to provide in combination with the parasitic capacitance 61 a tuned circuit having a resonant frequency approximating that of the auxiliary chrominance signal range 2 (FIG. 1).

Instead of using frequency bands 2 and 3 for the two chrominance components which are situated in the second and third loops of the response curve, as described above, both chrominance signals may have frequency bands situated in a common one of said loops, preferably the second loop, as indicated for the frequency bands 4 and 5 in FIG. 1. It will be apparent that the circuitry used with such an embodiment of the invention would not differ in substance from that described with reference to FIGS. 2 to 6.

In cases where the invention is applied to color television systems of the type using but a single chrominance component, for example dichrome systems or systems of the so-called "sequential memory" type, the circuitry will of course be simplified. Each of the systems shown in FIGS. 2 and 3 would only include two signal channels (a luminance channel and a chrominance channel or two chrominance channels) instead of the three shown. The second or less important one of the chrominance signals would then preferably be situated in a frequency band such as the band indicated at 2, in the range of the second loop of the response curve.

In yet another simplified modification of the invention which may be found useful in many cases, the matrices 13 (FIG. 2) and 48 (FIG. 3) would both be omitted. In the recording section, the red, green and blue color signals would be directly applied from input terminals 10, 11, 12 to amplifiers 17, 18, 19. In the reading section, the output signals from amplifiers 45, 46, 47 would represent the original red, green and blue signals and would be directly applied to the output terminals 49, 50, 51. In other words, the basic color signals would be directly recorded instead of recording luminance and chrominance signals derived therefrom. As is well known in television work, the recombination of the basic three color video signals into luminance and chrominance signals is a necessity imposed in standard broadcast television in order to ensure compatibility, that is, satisfactory reception of the images by means of an ordinary black-and-white TV receiver set. There are many instances however, e.g. in closed-circuit and industrial television, where the requirement for producing luminance and chrominance signals from the basic color signals is not present, and in such cases the recording and reading system of the invention may desirably be utilized in the modified way just described. In this version of the invention, it is generally preferable to use the green signal as the "main" signal having a broad bandwidth (as at 1, FIG. 1) in the normal frequency range. The red and blue signals may have the frequency bands 2 and 3 (or 4 and 5) respectively assigned to them. It is also within the scope of the invention to use one color signal, e.g. the green, as the "main" color signal and switch alternately between the remaining two colors (red and blue) as the single auxiliary color component in the second-order response loop.

Because of the progressive diminution of the crest amplitude value of the successive loops of the response curves, noted above, there tends to be a corresponding decrease in the signal/noise ratio for the color signals placed in the second and higher-order loops as used in accordance with the invention. Since however the bandwidth required for such color signals is usually narrower than the bandwidth required for the main signal, the resulting decrease in signal quality is not serious. In those embodiments of the invention, as the one first described, where more than one color signals (such as 2 and 3) are situated in a corresponding number of higher-order frequency-ranges, it is preferred to use progressively narrower bandwidths for the successive color signals. This is indicated in FIG. 1 where it will be noted that the bandwidth 3 is somewhat narrower than the bandwidth 2.

When compared with the conventional practice in recorded color television work, wherein all of the components of the color TV signal have been recorded in a common frequency band, with the chrominance components being impressed on subcarrier frequencies disposed within the frequency spectrum of the luminance signal, the invention presents important advantages. The intercalation of one or more chrominance subcarrier bands within the luminance signal band has tended to introduce spurious signal components which appeared as color distortion and other objectionable disturbances in the displayed pictures. To reduce, if not completely eliminate, such disturbances it has been necessary to employ complicated and expensive magnetic tape recording and reading equipment capable of transducing exceptionally broad frequency bands. Through the use of the present invention it becomes possible to achieve equal or better results with the use of inexpensive standard tape recorders and tape readers. These advantages are of especial value in connection with closed-circuit television systems such as used in industrial and didactic television, but are likewise applicable to broadcast systems.

While the invention has been described with particular reference to magnetic recording equipment, it is to be distinctly understood that it is not limited thereto. It will be clear from the above description that the invention can be applied to all transducing systems having an amplitude vs. frequency response curve of the general form shown in FIG. 1 wherein the amplitude response is vanishingly small for each of a series of frequency values, thereby making available at least one higher frequency range, distinctly separated from the frequency range normally used for the recording of the color TV signal. A response curve of this general shape is found to obtain in any device wherein a record medium is subjected to a relative scanning displacement past a transducer head having a scanning area of finite width as measured parallel to said displacement. In recording and reading devices using electromagnetic transducer heads, such as in the magnetic devices referred to above, the said scanning area is, of course, a non-magnetic air gap. In devices using electro-optical transducer means, of the types used e.g. for sound films, the scanning area would be an optical slit, which also is necessarily of finite width in the direction of film displacement. Hence the invention would also be applicable to such devices.

What I claim is:

1. In a color television signal recording and reproducing system including recording and reading transducer apparatus each of which a record medium is subjected to relative scanning displacement past a transducer head having a scanning gap of finite width whereby the amplitude/frequency response curve of the transducer head drops to zero at each of a series of spaced frequency values of the signal as recorded on said medium, said frequency values being related to the width of said gap, the provision of:

a recording section including:

- a recording transducer;
- input means receiving at least two video signal components at least one of which is a color component;
- a first modulator means having a modulating input connected to receive a first one of said components and producing a carrier frequency so selected that the frequency bandwidth of said first component as recorded by said transducer will be included between zero and a first zero-response frequency value of said series;
- a second modulator means having a modulating input connected to receive a second one of said components, constituting said color component, and producing a second carrier frequency so selected that the frequency bandwidth of said second component as recorded by by said transducer will be entirely above said first zero-response frequency value and will be included between two of the zero-response frequency values of said series; and mixer means connected to receive the outputs of said modulator means and apply the mixed modulated outputs to said transducer; and a reproducing section including:

- a reading transducer;
- bandpass filters having inputs connected in parallel to receive signals from said transducer; and
- demodulators having inputs connected to the outputs of the respective filters and arranged to demodulate the filter outputs with reference to said carrier frequencies respectively; whereby to deliver demodulated signals which are replicas of said video signal components.

2. The system defined in claim 1, wherein said input means receives three video signal components at least two of which are color components, and including a third modulator means having a modulating input connected to receive said third component and producing a third signal frequency so selected that the frequency bandwidth of said third component as recorded by said transducer will be entirely above said first zero-response frequency value and will be included between two of the zero-response frequency values of said series and separate from the bandwidth of said second component.

3. The system defined in claim 1, wherein said reading section includes a non-linearity compensating network connected between at least one of said filters and the related demodulator means, said compensating network having a non-uniform transfer characteristic predetermined to compensate substantially for the non-uniform transfer characteristics of said transducer heads.

4. The system defined in claim 1, wherein said transducer apparatus is magnetic, and said scanning gap of finite width constitutes a non-magnetic gap in an electromagnetic transducer head.

5. The system defined in claim 4, wherein said electromagnetic transducer head includes an impedance matching network associated therewith for increasing the transfer characteristic of said head in respect to the frequency bandwidth of said second component.

6. The system defined in claim 1, wherein said transducer apparatus is electro-optical, and said scanning gap of finite width constitutes an optical slit.

References Cited

UNITED STATES PATENTS

| | | | |
|---|---|---|---|
| 2,867,693 | 1/1959 | Raisbeck | 178—6.6 |
| 2,892,017 | 6/1959 | Houghton | 178—5.4 |

ROBERT L. GRIFFIN, *Primary Examiner.*

R. MURRAY, *Assistant Examiner.*

U.S. Cl. X.R.

178—6.6